J. STERBA.
BALL CASTER.
APPLICATION FILED MAY 9, 1908.

905,383.

Patented Dec. 1, 1908.

Witnesses
J. C. Simpson
W. F. Miller

Inventor
Joseph Sterba.
By Chandler & Chandler
Attorneys

UNITED STATES PATENT OFFICE.

JOSEPH STERBA, OF MIDLAND, SOUTH DAKOTA.

BALL-CASTER.

No. 905,383.

Specification of Letters Patent.

Patented Dec. 1, 1908.

Application filed May 9, 1908. Serial No. 431,889.

*To all whom it may concern:*

Be it known that I, JOSEPH STERBA, a citizen of the United States, residing at Midland, in the county of Stanley, State of South Dakota, have invented certain new and useful Improvements in Ball-Casters; and I do hereby declare the following to be a full, clear, and exact description of the invention, such as will enable others skilled in the art to which it appertains to make and use the same.

This invention relates to ball casters.

One object of the invention is to provide a caster embodying such characteristics that it may be readily and quickly sprung into engagement with the legs of a table or other article to be supported thereby.

Another object of the invention resides in the provision of a caster constructed to receive and sustain a bearing ball in spaced relation thereto through the instrumentality of smaller bearing balls so that the article supported upon the casters may be freely moved in any direction.

With the above and other objects in view, the present invention consists in the combination and arrangement of parts hereinafter more fully described, illustrated in the accompanying drawings and particularly pointed out in the appended claims.

Figure 1:
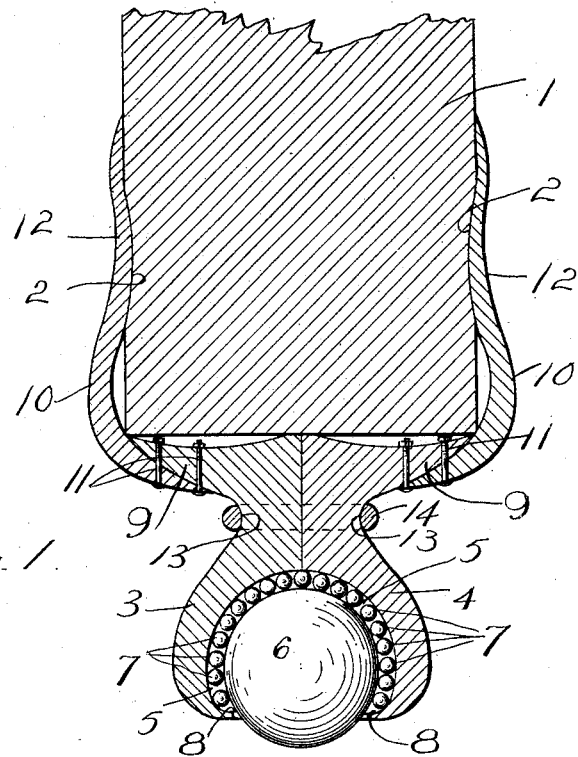
Figure 2:
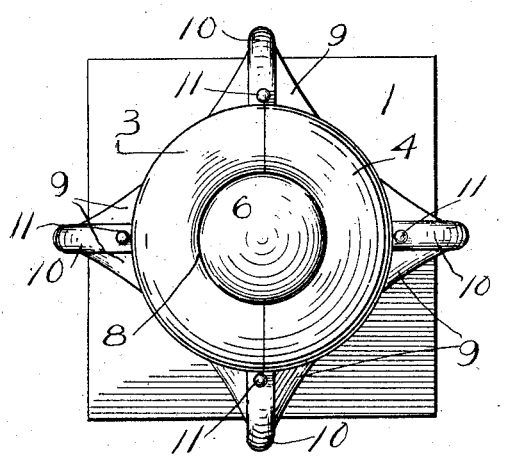
Figure 3:
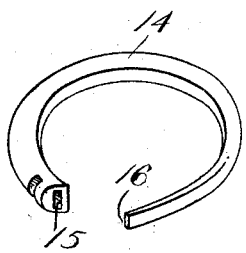

In the drawings:—Figure 1 is a transverse sectional view of my invention applied to a leg of a table or other article. Fig. 2 is an inverted plan view of the invention applied to a table or other article supporting leg. Fig. 3 is a detail perspective view of the clamping element for holding the sections of the caster together.

Referring now more particularly to the accompanying drawings, the reference character 1 indicates a portion of a table or other article supporting leg in which may be formed the series of recesses 2 at the sides of the leg or if the latter be round at equi-distant points thereupon and immediately above its lower end. The caster produced by me comprises sections 3 and 4, each having a substantially semi-spherical cavity in cross section in its lower end, adapted, when the sections are brought together, to form a socket 5 for the reception of the bearing ball 6, the socket 5 being of a diameter a little larger than the diameter of the ball so that a number of smaller bearing balls 7 may be disposed between the walls of the socket and the bearing ball 6 to facilitate the movement of the latter in the socket and thereby provide for a free and easy movement of the table or other article (not shown) which is supported by the table legs 1. Of course, these smaller bearing balls 7 will not quite fill the space between the bearing balls 6 and the walls of the socket 5, but they will be loosely disposed in a single layer to act as rollers and prevented from displacement by reason of the lower edges of each section 3 and 4 being directed inwardly toward the ball 6, as indicated at 8.

The sections 3 and 4 each carry a pair of rigid arms 9, and to each arm 9 I fixedly connect a spring arm 10. the connection between the rigid and spring arms being effected through the instrumentality of suitable bolts or other fastenings 11. Each spring arm is curved outwardly from the corresponding rigid arm and then inwardly, as indicated at 12, for engagement in the corresponding recess 2 in the leg 1 and continued outwardly out of the recess 2 and then inwardly, terminating in a sharp edge for snug engagement with the leg 1, as clearly shown in Fig. 1.

By virtue of the socketed lower end of the body of the caster and the formation of the rigid arms 9, there is provided intermediate the socketed end and the arms a contracted intermediate portion forming a neck 13 around which there is secured a suitable clamp 14 composed of suitable soft metal or other material having a slot 15 in one end and its opposite end tapered, as indicated at 16, for insertion through the slot 15, whereby the clamping band may be drawn tightly around the neck 13 of the caster and bent back upon itself, as indicated, to insure against unloosening of the band and to also insure of a positive locking of the sections 3 and 4 together.

What is claimed is:—

1. A caster comprising sections, each having a cavity in one end to provide a bearing ball receiving socket when the sections are assembled, a bearing ball fitted in said socket, a clamping band embracing the sections of the caster to secure them together and prevent displacement of the bearing ball, and spring arms secured to the body of the caster.

2. A caster comprising sections each having a cavity in one end to provide a socket when the sections are assembled, a bearing ball of smaller diameter than the diameter of the socket adapted to be sustained in said socket, bearing balls fitted in the space between the walls of the socket and the aforesaid bearing ball, means for clamping the sections together, and spring arms connected to the body of the caster.

3. A caster comprising sections each having a cavity in one end to provide a socket when the sections are assembled, a bearing ball of smaller diameter than the diameter of the socket adapted to be sustained in said socket, bearing balls fitted in the space between the walls of the socket and the aforesaid bearing ball, means for clamping the sections together, and spring arms detachably connected to the body of the caster for yieldable engagement with a supporting leg to detachably secure the casters to the latter.

In testimony whereof, I affix my signature, in presence of two witnesses.

JOSEPH STERBA.

Witnesses:
J. C. RUSSELL,
P. J. GALLAGHER.